(12) United States Patent
Macy et al.

(10) Patent No.: US 6,931,294 B2
(45) Date of Patent: Aug. 16, 2005

(54) METHOD FOR GENERATING THREE-DIMENSIONAL CAD MODELS OF COMPLEX PRODUCTS OR SYSTEMS

(75) Inventors: William D. Macy, St. Peters, MO (US); Daniel J. Sherwinter, St. Louis, MO (US); Eric Raphael Delph, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/267,619

(22) Filed: Oct. 8, 2002

(65) Prior Publication Data

US 2004/0068338 A1 Apr. 8, 2004

(51) Int. Cl.[7] .............................................. G06F 19/00
(52) U.S. Cl. ......................... 700/98; 345/418; 345/419
(58) Field of Search ............................ 700/98; 345/418, 345/419; 703/1, 6, 7

(56) References Cited

U.S. PATENT DOCUMENTS

| | | | | |
|---|---|---|---|---|
| 4,238,840 A | * | 12/1980 | Swainson ..................... 365/119 |
| 4,937,768 A | * | 6/1990 | Carver et al. .................. 703/1 |
| 4,945,488 A | * | 7/1990 | Carver et al. ................ 700/182 |
| 4,956,764 A | * | 9/1990 | Carver et al. ................. 700/59 |
| 5,023,800 A | * | 6/1991 | Carver et al. ................ 700/182 |
| 5,033,014 A | * | 7/1991 | Carver et al. .................. 703/1 |
| 5,240,416 A | * | 8/1993 | Bennington ................... 434/30 |
| 5,742,288 A | * | 4/1998 | Nishizaka et al. ........... 345/418 |
| 5,796,617 A | * | 8/1998 | St. Ville ....................... 700/98 |
| 5,949,685 A | * | 9/1999 | Greenwood et al. ......... 700/193 |
| 6,058,259 A | * | 5/2000 | Murakami ...................... 703/2 |
| 2001/0056309 A1 | * | 12/2001 | Jain et al. ...................... 700/98 |
| 2002/0094134 A1 | * | 7/2002 | Nafis et al. .................. 382/285 |
| 2004/0051711 A1 | * | 3/2004 | Dimsdale et al. ........... 345/419 |
| 2004/0107080 A1 | * | 6/2004 | Deichmann et al. ........... 703/6 |

* cited by examiner

*Primary Examiner*—Leo Picard
*Assistant Examiner*—Carlos R. Ortiz-Rodriguez
(74) *Attorney, Agent, or Firm*—Black Lowe & Graham PLLC (57) ABSTRACT

A process for generating one or more three-dimensional computer CAD solid models for a complex product. The process includes evaluating the complex product, and selecting one or more three-dimensional modeling methods for the components of the complex product based on the evaluation of the complex product. Three-dimensional digital CAD solid models are generated for the components based on the selected one or more methods. A common reference point is set for each of the generated three-dimensional digital CAD solid models. The generated three-dimensional digital CAD solid models are combined based on the set reference point to form a three-dimensional digital CAD solid model for the complex product.

14 Claims, 7 Drawing Sheets

METHOD FOR GENERATING THREE-DIMENSIONAL CAD MODELS OF COMPLEX PRODUCTS OR SYSTEMS

FIELD OF THE INVENTION

This invention relates generally to lean engineering and, more specifically, to lean engineering of insufficiently-defined complex products or systems.

BACKGROUND OF THE INVENTION

Lean engineering and manufacturing tools and processes use three-dimensional Computer-Aided Drafting (CAD) models (henceforth referred to as "CAD solid models") of the complex products that are being created or improved. Lean engineering and manufacturing tools and processes have been shown to significantly improve the design, development, and support of complex products. Lean engineering and manufacturing techniques have been effective tools for creating complex products from scratch. However, the non-recurring costs of converting a legacy drawing based product into CAD solid models, to enable lean engineering techniques, is cost prohibitive.

For example, a retrofit upgrade for an aircraft is much less expensive when the retrofit is solid-modeled on computer and analyzed by all parties of the retrofit process before the part or change is performed. However, if no CAD solid model exists for the aircraft, there is a significant non-recurring cost in attaining those solid models. This cost could be more than the cost of the retrofit.

Therefore, there exists a need for a process to re-engineer existing complex products in a CAD solid model framework in order to apply lean engineering techniques.

SUMMARY OF THE INVENTION

The present invention is a process and system for generating the CAD solid models needed to adequately define a complex product. The models are generated based on an extensive knowledge of any existing data and where the least expensive modeling techniques can be applied, thereby producing accurate models at minimal cost. The invention enables creation of CAD solid models for articles with little or no existing 3-D solid model definition at less expense and improved quality.

According to one embodiment of the present invention, a process includes evaluating the complex product, and selecting one or more three-dimensional modeling methods for the components of the complex product based on the evaluation of the complex product. CAD solid models are generated for the components based on the selected one or more methods. A common reference coordinate system is set for each of the generated CAD solid models. The generated CAD solid models are combined based on the set reference coordinate system to form a CAD solid model for the entire complex product.

BRIEF DESCRIPTION OF THE DRAWINGS

The preferred and alternative embodiments of the present invention are described in detail below with reference to the following drawings.

DETAILED DESCRIPTION OF THE INVENTION

FIGS. 1–6 illustrate a flow diagram for generating CAD solid models of previously unmodeled or partially modeled complex products. By performing the method described below, CAD solid models are generated in the most efficient and effective manner for use with existing lean engineering and lean manufacturing tools and processes. By way of overview, a routine 100 begins at a block 106 where a developer (or developing team) performs an evaluation of a system to be re-engineered. At a block 110, the developer selects output data (i.e., 3-D solid modeling) processing methods based on the evaluation performed at the block 106. At a block 114, the developer generates output data using each of the selected output data processing methods. Each of the generated output data (CAD solid models) has a common reference coordinate system identified. At a block 1118, the developer generates an output product by combining the generated output data from each of the selected output data processing methods as necessary, based on the common reference point.

Figure 1:
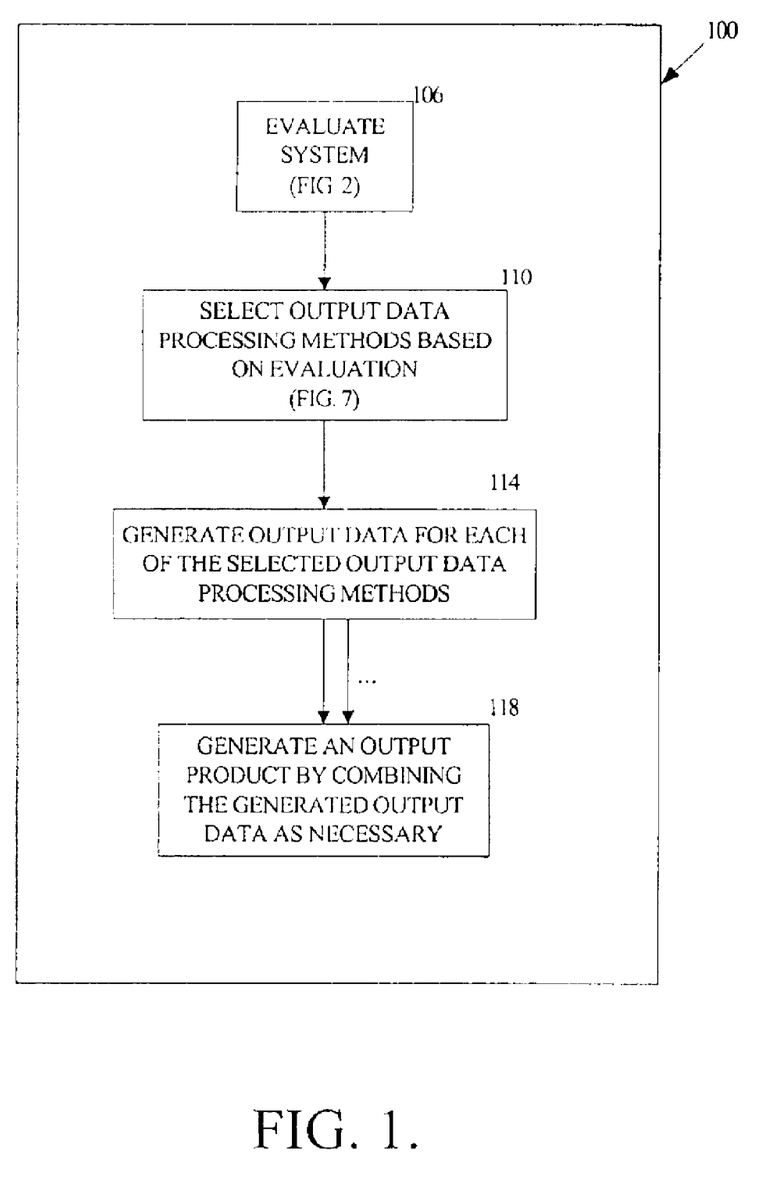
FIGS. 1–6 illustrate a flow diagram for performing an exemplary process of the present invention.
Figure 2:
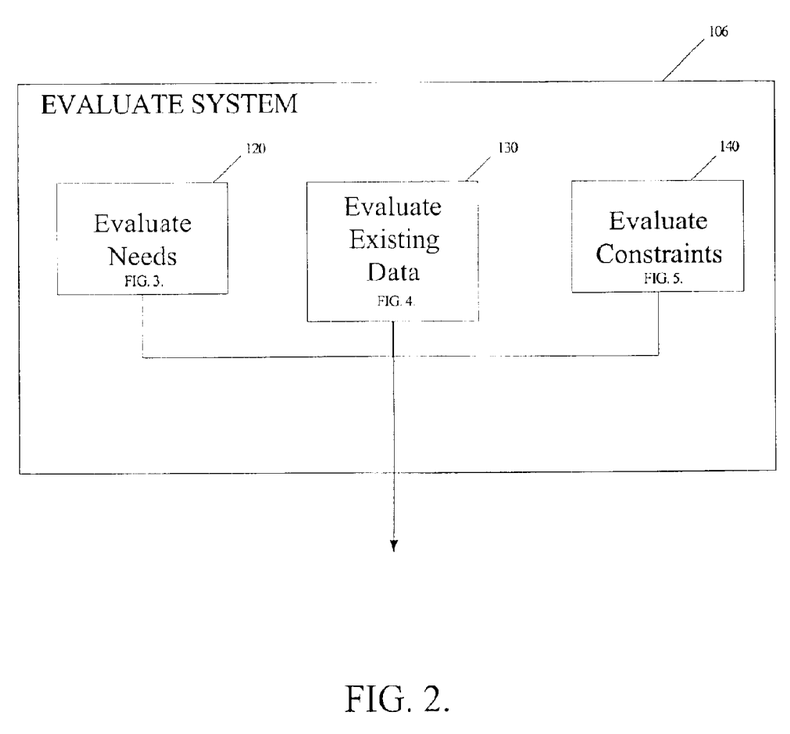

FIG. 2 illustrates example evaluations that the developer performs at the block 106 (FIG. 1). At a block 120 the developer evaluates the customer's needs. The evaluation of customer needs is described in more detail with respect to FIG. 3. At a block 130 the developer evaluates existing data. The evaluation of existing data is described in more detail below in FIG. 4. At a block 140 the developer evaluates constraints that exist. The evaluation of constraints with respect to the complex system and production is described in more detail below in FIG. 5.

Figure 3:
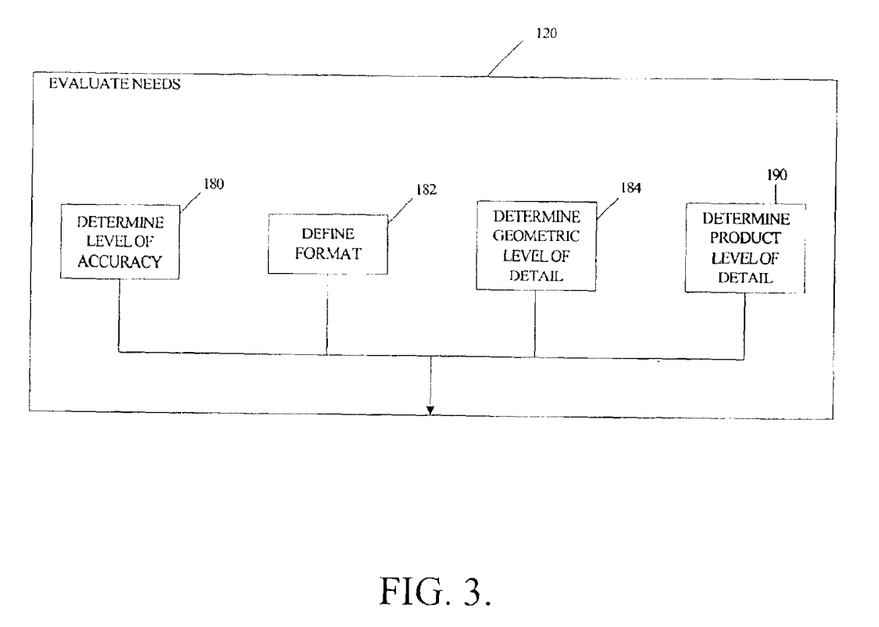
Figure 4:
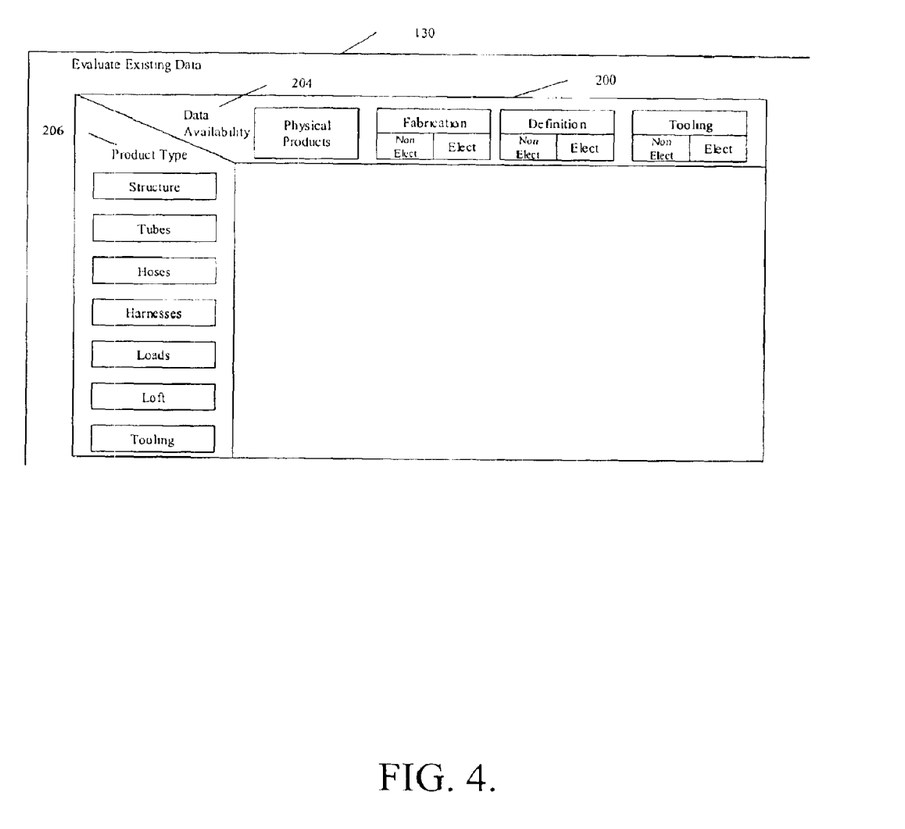

FIG. 3 illustrates an example of some of the needs that are evaluated by the developer when performing an evaluation of the needs as shown at the block 120 (FIG. 2). At a block 180, the developer determines a level of accuracy for the CAD solid model. For example the level of accuracy is "±0.030 inches". The determined level of accuracy may be different for different parts of the complex product. At a block 182, the developer defines or determines the digital format the customer needs for the final CAD solid model. At a block 184, the developer determines a geometric level of detail for various assemblies or components of the complex product. For example the geometric level of detail is "must be able to resolve approximate location of rivet heads from polymesh data" The determined geometric level of detail may be different for different parts of an installation or assembly. At a block 190, the developer determines the model level of detail for various regions of the product. For example, the product level of detail is "all boxes, clamps, routings, and structural entities (excluding mounting hardware) must be able to be isolated in post-processing as mono-detail CAD solid models." The determined model level of detail may be different for different regions of the product. FIG. 4 illustrates a designer's evaluation of existing data from the block 130 of FIG. 2. In one embodiment, the developer suitably uses a table 200 for identifying what type of data is available for different components (product type) of the product. The table 200 suitably includes a data availability axis 204 and a model-type axis 206. Exemplary rows in the product type axis 206 include without limitation structure, tubes, hoses, harnesses, loads, loft, and tooling. Exemplary columns in the data availability axis 204 include without limitation physical products, fabrication, definition, and tooling. This data can be available in either electronic or non-electronic formats. Both of which are important to reuse as much information as possible. Physical products when checked for a item type means that the actual product is available. Fabrication when checked for a item type means information and/or specifications which define the fabrication of the item. When a item type has a check in the electronic column, digital data is available for the item. When a item type has a check in the non-electric column, hard copy information about the item type exists. As can be appreciated, other data availability columns and product type rows can be included within the table 200. Also, the table 200 can be implemented in various visual formats depending upon a developer's desired use.

Figure 5:
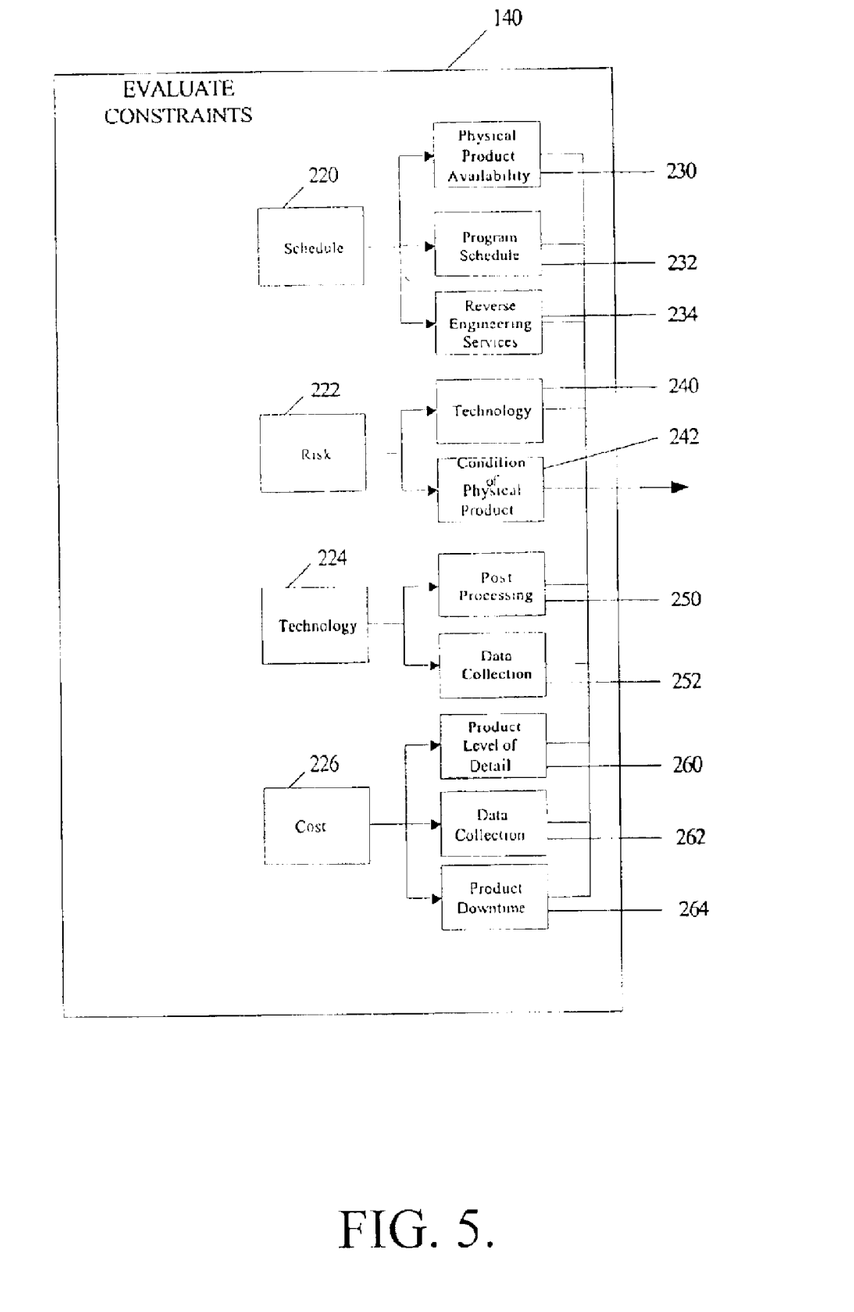

FIG. 5 illustrates examples of evaluations suitably performed during evaluation of constraints at the block 140 (FIG. 2). In one embodiment, the developer evaluates the following constraints: scheduling constraints at a block 220; risk constraints at a block 222; technology constraints at a block 224; and cost constraints at a block 226. The evaluation of scheduling constraints suitably includes an evaluation of availability of the physical product to be modeled at a block 230, a program schedule at a block 232, and constraints of the developer (i.e., re-engineering services) at a block 234. The scheduling evaluations performed at the blocks 230–234 are determinations of the scheduling availability of the product, of the scheduling limitations of the developer, and with regards to the program schedule, when solid models are needed.

The evaluation of risk constraints at the block 222 suitably includes at a block 240 an evaluation of technology risk, and at a block 242 an evaluation of the condition of the physical product. With regards to the evaluations at the blocks 240 and 242, the developer determines what challenges exist if on site modeling techniques need to be used. These challenges include, but are not limited to, uncertainties due to immaturity of the current technology and processes.

The evaluation of the technology constraints includes at a block 250 an evaluation of post-processing constraints, and at a block 252 an evaluation of data collection constraints. With regards to the evaluations at the blocks 250 and 252, the developer determines what will limit current technology in collecting and post-processing the desired data. These constraints include, but are not limited to computing requirements, optical requirements, environmental requirements, and data requirements. An evaluation of the cost constraints includes at a block 260 a cost evaluation of product level of detail, at a block 262 a cost evaluation of data collection, and at a block 264 an evaluation of product availability.

Figure 6:
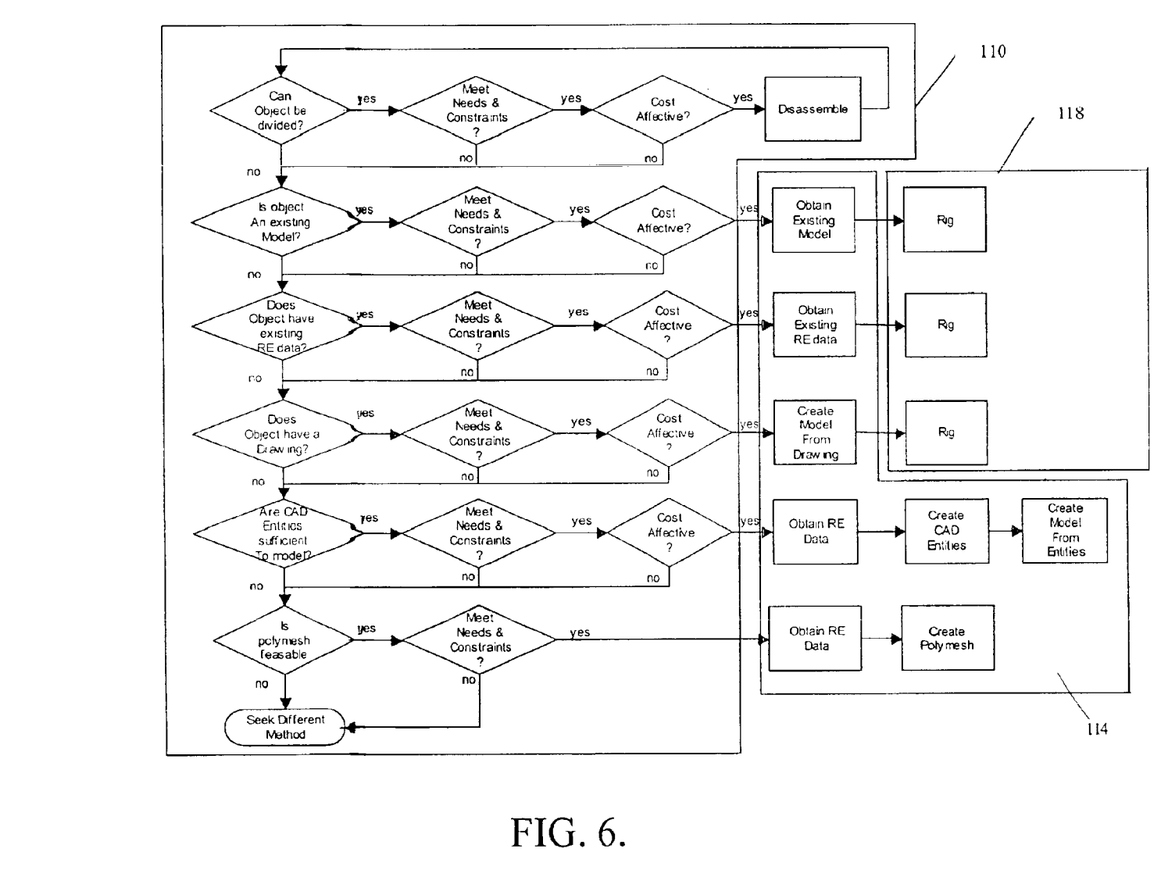

Referring back to FIG. 1, the selection of the output data processing method as performed at the block 110 is performed by the developer after careful evaluation has been performed at the block 106. In FIG. 6 the evaluation process, block 110, is expanded. Here the developer chooses the most cost effective manner with respect to the evaluated needs and constraints. In block 114 the developer collects and/or creates the appropriate data to define the desired product. The following are exemplary data gathering methods: Laser Tracker, Photogrammetry, White-Light Fixed-Base Scanner, Laser Fixed-Base Scanner, Laser Articulating-Arm-Based Scanner, and Point Probe.

The following are exemplary output data processing methods that the developer has available for implementing and generating 3-D solid.models: computer-aided design (CAD) entity generation; polymesh generation; coordinate system information; raw 3-D point data; and geometric data.

Once the developer has collected and/or generated the required data, block 118 brings the various methods of creation into a common organized definition of the product. Independently modeled parts are rigged into the appropriate reference coordinate system.

Figure 7:
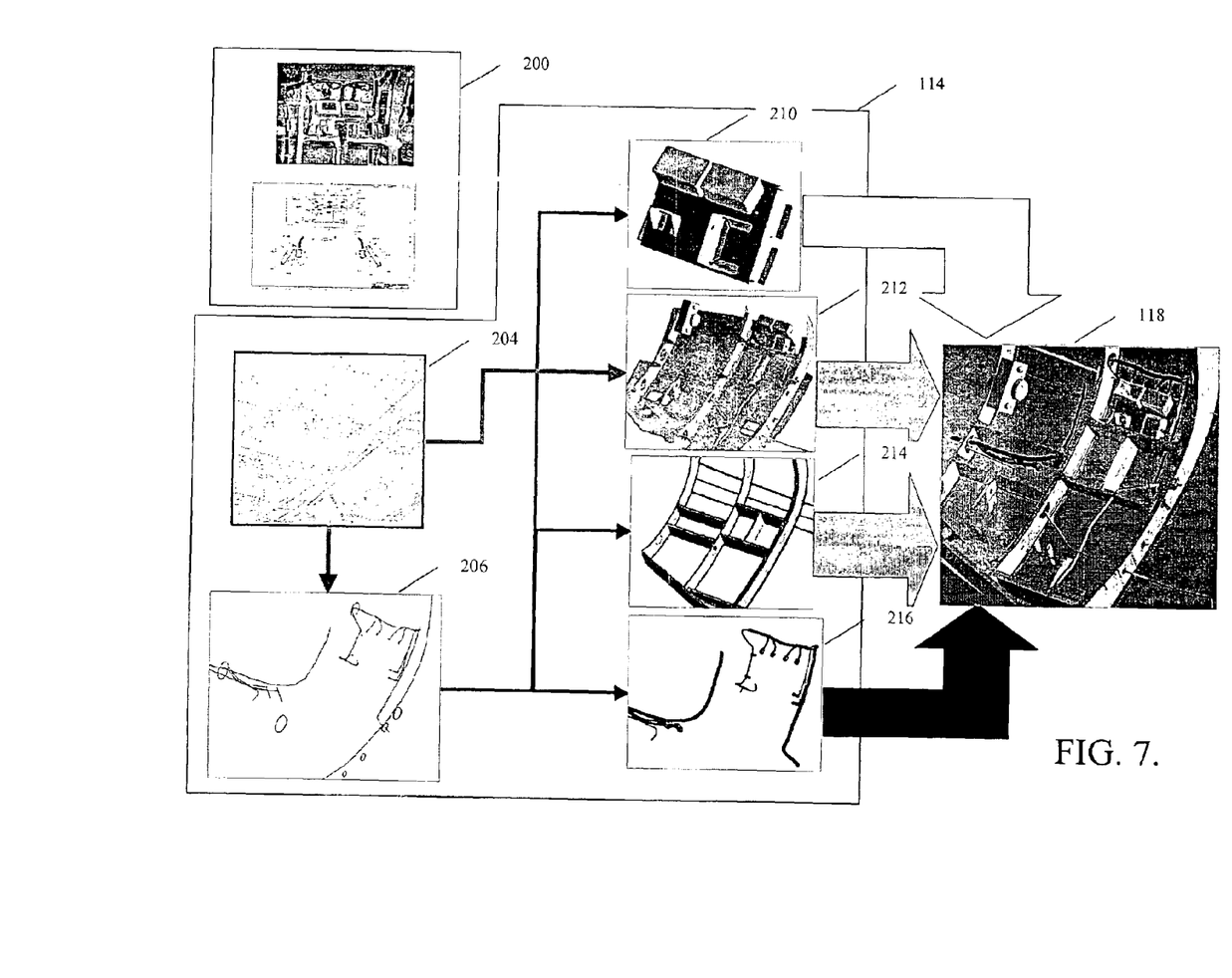
FIG. 7 illustrates an example of the process performed on an existing complex product.

The following is a non-limiting exemplary illustration of the uses of the aforementioned scanning devices and CAD solid model generating techniques. A retrofit is required for a region of an aircraft containing boxes, electrical routings, hydraulic routings, electrical hardware, mounting hardware, the surrounding structure, and the underlying aircraft skin. This is therefore considered a complex product. The customer wants the resulting CAD solid models to have an accuracy of within 0.030 inches, and each component should be its own mono-detail CAD solid model wherever possible. This case is illustrated in FIG. 7. First, an evaluation is made of the existing engineering and geometric data for this region of the aircraft. The data available that result from the evaluation are shown in block 200 on the left side of FIG. 7. The data available includes hard-copy drawings 200 many of the vendor components and structural entities and various photos and illustrations of the region. Once the evaluation of the existing data and other evaluations are complete, the developer selects the types of tools and processes needed to gather 3D data from the aircraft. In this case, the developer decides to use the following data gathering tools:

A Laser Tracker and Photogrammetry to capture the aircraft coordinate system

A White-Light Fixed-Base Scanner to gather a good 3D point cloud of the entire region where line of sight is not an issue And, a Articulating-Arm-Based Laser Scanner and Point Probe to gather component-specific geometric data and locations of key features After the 3D data is adequately collected, the developer decides to use chosen tools and processes to create the following manifestations of the data:

Raw 3D Point Data (block 204)

Polymeshes (block 212) of the point cloud data to be used as a backdrop for the mono-detail CAD solid models in places where the latter will not be present And, CAD Entities (block 206) extracted from raw 3D Point Data (block 204) or alternate 3D measurement methods can be generated to aid in the CAD modeling process Once the evaluation of the existing data, the other data gathering, and the other data creation are complete; the developer selects the type of model generation methods to be used for various component parts of the complex product to best use the data available based on the evaluated needs and constraints. The images shown in blocks 210–216 illustrate the results of the selected method for various component parts of the complex product. At the block 210, the mono-detail three-dimensional CAD solid models are generated primarily from the engineering drawings and illustrations with help from the CAD entities. The components shown in block 214 are structural components of the complex product and are generated primarily from the 3D point data and CAD entities, but filled in with rough CAD models based on existing data. The image shown in block 216 illustrates three-dimensional CAD solid models of electrical routing components in the complex product which are generated primarily using CAD entities and standard part models (for standard parts like electrical connectors, backshells, etc.). CAD entities are created 2 ways: 1) Point probes and other tools which can collect feature data will generate CAD entities, and 2) CAD entities can be extracted ex post facto from the raw point cloud.

After all the components have been represented as 3-D solid models, the 3-D solid models are combined into a single 3-D representation of the complex product based on a common reference coordinate system, such as that shown in block 118.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for generating a three-dimensional digital solid model for a complex product that includes a plurality of components, the method comprising:

evaluating the complex product;

determining one or more 3D data gathering tools to use based on the evaluation of the complex product;

determining one or more three-dimensional modeling methods to use for modeling the components of the complex product based on the evaluation of the complex product and the determined one or more 3D data gathering tools;

generating three-dimensional digital computer-aided design (CAD) solid models for the components based on the determined one or more methods;

setting a common reference point for each of the generated three-dimensional digital CAD solid models; and combining the generated three-dimensional digital CAD solid models based on the set reference point to form a three-dimensional digital CAD solid model for the complex product, wherein the one or more three-dimensional modeling methods is selected from a list consisting of existing data models, computer aided design entity generation methods, and polymesh model generation methods, wherein the one or more three-dimensional modeling methods include a plurality of digital data gathering techniques selected from a list consisting of laser tracking, Photogrammetry, optically scanning, and coordinate measuring.

2. The method of claim 1, wherein evaluating comprises evaluating needs of a customer associated with the complex product.

3. The method of claim 2, wherein evaluating the needs of the customer includes evaluating a level of accuracy desired by the customer, evaluating a format for the solid models, and evaluating a level of detail of components of the complex product.

4. The method of claim 1, wherein evaluating includes evaluating preexisting data for components of the complex product.

5. The method of claim 4, wherein the evaluated preexisting data includes one or more product types and data types associated with the one or more product types.

6. The method of claim 1, wherein evaluating includes evaluating constraints.

7. The method of claim 6, wherein the evaluated constraints include scheduling constraints, risk constraints, technology constraints, and cost constraints.

8. A method for retrofitting a complex product that includes a plurality of components, the method comprising:

evaluating the complex product;

determining one or more three-dimensional modeling methods to use for modeling the components of the complex product based on the evaluation of the complex product;

generating three-dimensional digital computer-aided design (CAD) solid models for the components based on the selected one or more three-dimensional modeling methods;

setting a common reference point for each of the generated three-dimensional digital CAD solid models;

generating a single CAD solid model of the complex product by combining the generated three-dimensional digital CAD solid models based on the set reference point to form a three-dimensional digital CAD solid model for the complex product; and retrofitting the complex product according to the generated single CAD solid model, wherein the one or more three-dimensional modeling methods is selected from a list consisting of existing data models, CAD entity generation methods, and polymesh model generation methods, wherein the one or more three-dimensional modeling methods include a plurality of digital data gathering techniques selected from a list consisting of laser tracking, Photogrammetry, optically scanning, and coordinate measuring.

9. The method of claim 8, wherein evaluating comprises evaluating needs of a customer associated with the complex product.

10. The method of claim 9, wherein evaluating the needs of the customer includes evaluating a level of accuracy desired by the customer, evaluating a format for the solid models, and evaluating a level of detail of components of the complex product.

11. The method of claim 8, wherein evaluating includes evaluating preexisting data for components of the complex product.

12. The method of claim 11, wherein the evaluated preexisting data includes one or more product types and data types associated with the one or more product types.

13. The method of claim 8, wherein evaluating includes evaluating constraints.

14. The method of claim 13, wherein the evaluated constraints include scheduling constraints, risk constraints, technology constraints, and cost constraints.

* * * * *